(12) United States Patent
Li et al.

(10) Patent No.: US 9,774,720 B2
(45) Date of Patent: Sep. 26, 2017

(54) AUTHENTICATION METHOD AND AUTHENTICATION DEVICE FOR COMMUNICATION APPARATUS AND COMMUNICATION APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yonghua Li, Beijing (CN); Na An, Beijing (CN); Yang Zhang, Beijing (CN); Xuzhong Liu, Beijing (CN)

(73) Assignees: BOE TECHNOLOGY GROUP CO., LTD., Beijing (CN); BEIJING BOE OPTOELECTRONICS TECHNOLOGY CO., LTD, Beijing (CN)

( * ) Notice: Subject to any disclaimer, the term of this patent is extended or adjusted under 35 U.S.C. 154(b) by 113 days.

(21) Appl. No.: 14/529,986

(22) Filed: Oct. 31, 2014

(65) Prior Publication Data
US 2015/0334565 A1 Nov. 19, 2015

(30) Foreign Application Priority Data
May 14, 2014 (CN) .......................... 2014 1 0203434

(51) Int. Cl.
*H04M 3/16* (2006.01)
*H04M 1/675* (2006.01)
(Continued)

(52) U.S. Cl.
CPC ............. *H04M 1/675* (2013.01); *H04M 1/67* (2013.01); *H04W 8/18* (2013.01); *H04W 12/06* (2013.01)

(58) Field of Classification Search
CPC ......... H04W 8/18; H04W 12/06; H04M 1/67; H04M 1/675
(Continued)

(56) References Cited

U.S. PATENT DOCUMENTS 5,266,782 A * 11/1993 Alanara ................ H04M 1/675
235/380
5,940,773 A * 8/1999 Barvesten ............. H04W 12/06
340/7.45
(Continued)

FOREIGN PATENT DOCUMENTS

| CN | 1753524 A | 3/2006 |
| CN | 101166320 A | 4/2008 |

(Continued)

OTHER PUBLICATIONS

First Office Action dated Feb. 29, 2016 corresponding to Chinese application No. 201410203434.1.

*Primary Examiner* — William Nealon
(74) *Attorney, Agent, or Firm* — Nath, Goldberg & Meyer; Joshua B. Goldberg

(57) ABSTRACT

The present invention provides authentication method and authentication device for communication apparatus and a communication apparatus. The communication apparatus comprises at least one of a communication terminal and a communication card, and the authentication method comprises: S10: binding identity information of owner of the communication apparatus to the communication apparatus; S20: requesting to obtain identity information of a user when the communication apparatus is restarted; S30: comparing the identity information of the user obtained through requesting with the identity information of the owner of the communication apparatus bound to the communication apparatus; S40: determining whether the obtained identity information of the user is the same as the identity informa-
(Continued)

tion of the owner of the communication apparatus bound to the communication apparatus, if yes, proceeding to step S50, otherwise, proceeding to step S60; S50: starting the communication apparatus normally, and S60: locking the communication apparatus.

12 Claims, 1 Drawing Sheet

(51) Int. Cl.
*H04W 12/06* (2009.01)
*H04W 8/18* (2009.01)
*H04M 1/67* (2006.01)

(58) Field of Classification Search
USPC .................................................. 455/411, 558
See application file for complete search history.

(56) References Cited

U.S. PATENT DOCUMENTS

| | | | |
|---|---|---|---|
| 5,996,028 A * | 11/1999 | Niimi | H04W 8/183 455/410 |
| 2004/0005911 A1 * | 1/2004 | Guirauton | H04L 63/0853 455/558 |
| 2004/0005912 A1 * | 1/2004 | Hubbe | H04W 88/02 455/558 |
| 2009/0305668 A1 * | 12/2009 | Ahn | H04W 12/12 455/410 |

FOREIGN PATENT DOCUMENTS

| | | |
|---|---|---|
| CN | 103634477 A | 3/2014 |
| JP | 2010055332 A | 3/2010 |
| WO | 2010144718 A2 | 12/2010 |

* cited by examiner

AUTHENTICATION METHOD AND AUTHENTICATION DEVICE FOR COMMUNICATION APPARATUS AND COMMUNICATION APPARATUS

FIELD OF THE INVENTION

The present invention relates to the field of information security of communication apparatus, and particularly relates to an authentication method for communication apparatus, an authentication device for communication apparatus and a communication apparatus.

BACKGROUND OF THE INVENTION

With the rapid development of the communication technology, various communication apparatuses (e.g. mobile phones, tablet computers, and the like) have come into general application in people's lives. With the improvements in various functions of a communication apparatus, a large amount of information related to a user may be stored in the communication apparatus, and once the communication apparatus is lost, the information regarding the user may leak out, which may result in serious consequences.

In Chinese Patent Application Publication No. CN101789988A, a method for binding a mobile phone undo SIM card is disclosed, wherein password is set by a user to prevent the mobile phone from being used by another people after the mobile phone is lost. However, this method has at least the following inconvenience: as the password may be forgotten or lost, the mobile phone cannot be normally used when the user forgets the password.

SUMMARY OF THE INVENTION

In view of the above inconvenience, an object of the present invention is to provide an authentication method for communication apparatus, an authentication device for communication apparatus and a communication apparatus, so as to reduce the occurrence of information leakage, and avoid the above inconvenience caused to the user at the same time.

To achieve the above object, the present invention provides an authentication method for communication apparatus, the communication apparatus comprises at least one of a communication terminal and a communication card, and the authentication method comprises:

S10: binding identity information of owner of the communication apparatus to the communication apparatus;

S20: requesting to obtain identity information of a user when the communication apparatus is restarted;

S30: comparing the identity information of the user obtained through requesting with the identity information of the owner of the communication apparatus bound to the communication apparatus;

S40: determining whether the obtained identity information of the user is the same as the identity information of the owner of the communication apparatus bound to the communication apparatus, and if yes, then proceeding to step S50, otherwise, proceeding to step S60;

S50: starting the communication apparatus normally, and
S60: locking the communication apparatus.

Preferably, the identity information of the owner of the communication apparatus includes information in identity card of the owner of the communication apparatus; the identity information of the user includes information in identity card of the user.

Preferably, the communication apparatus comprises the communication terminal and the communication card which is replaceably arranged in the communication terminal, and step S10 specifically comprises:

S11: obtaining information of the communication card and the information in the identity card of the owner of the communication apparatus; and S12: storing the information in the identity card of the owner of the communication apparatus and the information of the communication card.

Further, when the communication card in the communication terminal is replaced by a new communication card, step S20 further includes a step of: requesting to obtain information of the new communication card.

Preferably, after the communication apparatus is normally started in step S50, the authentication method, after step S50, further comprises:

S70: deleting the stored information of the communication card.

Preferably, the authentication method further comprises step S80: obtaining information of the new communication card, and storing the information of the new communication card.

Correspondingly, the present invention further provides an authentication device for communication apparatus, the communication apparatus comprises at least one of a communication terminal and a communication card, and the authentication device comprises: a binding unit, a processing unit and an information obtaining unit, wherein, both the binding unit and the information obtaining unit are electrically connected to the processing unit, the binding unit is capable of binding identity information of owner of the communication apparatus to the communication apparatus, the information obtaining unit is capable of obtaining identity information of a user and the identity information of the owner of the communication apparatus, the processing unit is capable of issuing a request instruction of requesting to obtain the identity information of the user and comparing the identity information of the user obtained by the information obtaining unit with the identity information of the owner of the communication apparatus, and the communication apparatus is started normally if the identity information of the user is the same as the identity information of the owner of the communication apparatus, or the communication apparatus is locked if the identity information of the user is different from the identity information of the owner of the communication apparatus.

Preferably, the identity information of the owner of the communication apparatus includes information in identity card of the owner of the communication apparatus; the identity information of the user includes information in identity card of the user.

Preferably, the communication apparatus comprises the communication terminal and the communication card which is replaceably arranged in the communication terminal, the information obtaining unit comprises a first obtaining module capable of obtaining the information of the communication card arranged in the communication terminal and a second obtaining module capable of obtaining the information in the identity card of the user or the information in the identity card of the owner of the communication apparatus, the authentication device further comprises a storage unit, which is capable of storing the obtained information of the communication card and the information in the identity card of the owner of the communication apparatus, and when the communication card arranged in the communication terminal is replaced by a new communication card, the processing unit is capable of issuing a request instruction requesting to obtaining information of the new communication card.

Preferably, the processing unit is capable of deleting the information of the communication card stored in the storage unit after the communication apparatus is started normally.

Preferably, when the communication card arranged in the communication terminal is replaced by a new communication card, the first obtaining module is capable of obtaining the information of the new communication card, and the storage unit is capable of storing the information of the new communication card.

The present invention further provides a communication apparatus comprising at least one of a communication terminal, a communication card and the above authentication device.

In the present invention, when the identity information of a user is the same as that of the owner of a communication apparatus, the communication apparatus is started normally; when the identity information of the user is different from that of the owner of the communication apparatus, the communication apparatus is locked, which can prevent the communication apparatus from being operated by a user other than the owner of the communication apparatus, thus reducing the occurrence of information leakage from the communication apparatus. Meanwhile, since the identity information used in the authentication method is the information in the identity cards of the owner of the communication apparatus and the user, it can be hardly lost, which makes the authentication method more convenient and reliable.

BRIEF DESCRIPTION OF THE DRAWINGS

The drawings, which construct a part of the description, are provided for further understanding of the invention and are used for illustrating the invention in conjunction with the detailed embodiments below, rather than limiting the scope of the invention.

DETAILED DESCRIPTION OF THE EMBODIMENTS

The specific implementations of the present invention are described in detail below in conjunction with the accompanying drawings. It should be understood that the specific implementations described herein are merely used for describing and explaining the present invention, rather than limiting the present invention.

Figure 1:
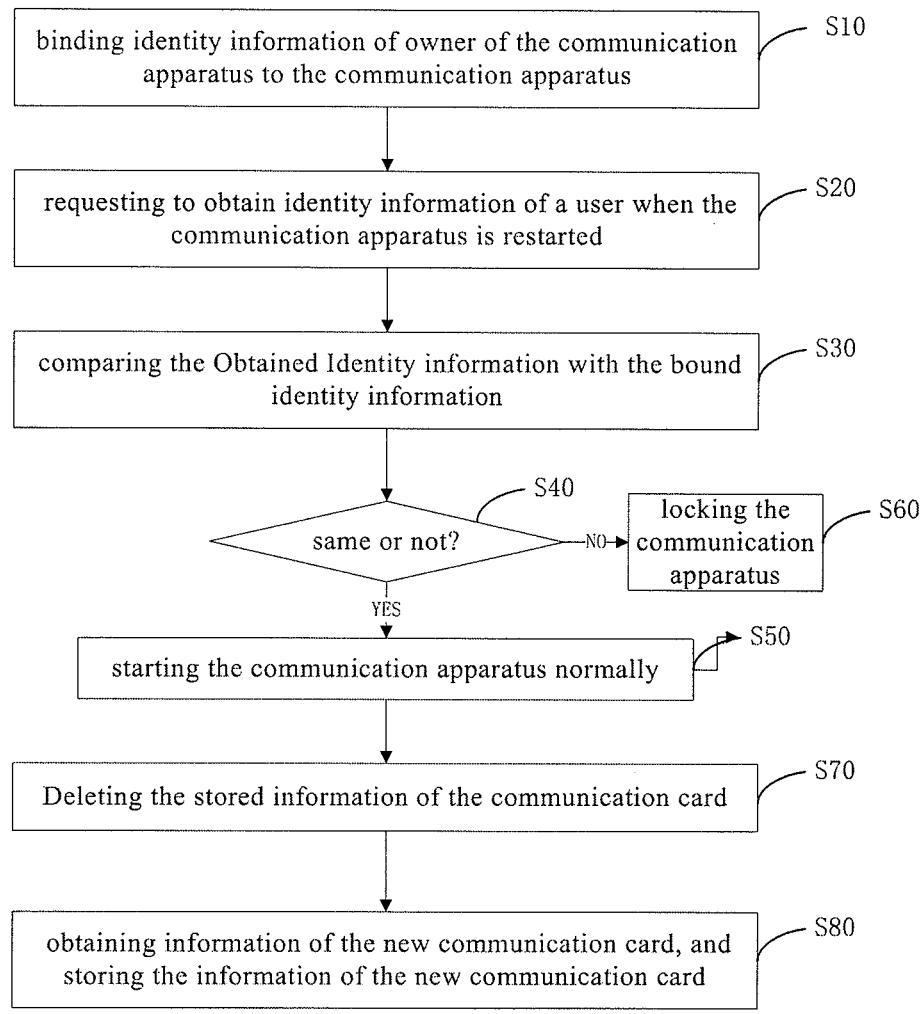
FIG. 1 is a flowchart of an authentication method for communication apparatus provided by the present invention.

As an aspect of the present invention, an authentication method for communication apparatus is provided, the communication apparatus comprises at least one of a communication terminal and a communication card, and as shown in FIG. 1, the authentication method comprises:

S10: binding identity information of owner of the communication apparatus to the communication apparatus;

S20: requesting to obtain identity information of a user when the communication apparatus is restarted;

S30: comparing the identity information of the user obtained through requesting with the identity information of the owner of the communication apparatus bound to the communication apparatus;

S40: determining whether the obtained identity information of the user is the same as the identity information of the owner of the communication apparatus bound to the communication apparatus, and if yes, then proceeding to step S50, otherwise, proceeding to step S60;

S50: starting the communication apparatus normally, and

S60: locking the communication apparatus.

The "owner of a communication apparatus" refers to the person who owns the communication apparatus legally, and the "user" refers to the person who is using the communication apparatus. Normally, the owner of the communication apparatus and the user are the same person, but when the communication apparatus is lost or stolen, the owner of the communication apparatus and the user are two different persons. "Binding the identity information of owner of the communication apparatus to the communication apparatus" refers to that the identity information is associated with the communication apparatus in a certain manner, for example, by storing the identity information, so as to influence the operation of the communication apparatus. In addition, in the present invention, identity information, device information and the like may be directly stored in the communication apparatus, or be stored in a device or memory connected to the communication apparatus, and the connection between the device or the memory and the communication apparatus includes but not limited to direct connection, indirect connection and communicable connection, which is not limited in the present invention.

When a person obtains the communication apparatus illegally, generally, he/she will turn off the communication apparatus so as to avoid the owner of the communication apparatus from contacting him/her by way of communication means. When the person who illegally obtains the communication apparatus restarts the communication apparatus, step S20 is performed, that is, identity information of the user is requested, and then steps S30 and S40 are performed, that is, whether the user who is currently holding the communication apparatus is the owner of the communication apparatus is determined by comparison.

In the present invention, when the identity information of the user obtained through requesting by the communication apparatus is the same as the identity information of the owner of the communication apparatus bound to the communication apparatus, that is, when the user who is using the communication apparatus and the owner of the communication apparatus are the same person, the communication apparatus is started normally; when the identity information of the user obtained, through requesting by the communication apparatus is different from the identity information of the owner of the communication apparatus bound to the communication apparatus, that is, when the user who is using the communication apparatus and the owner of the communication apparatus are two different persons, the communication apparatus is locked, thus the communication apparatus is prevented from being controlled by a person other than the owner of the communication apparatus, and avoid the information in the apparatus from leaking out. Compared to the prior art, the identity information in the authentication method is more stable, and can hardly be lost, which makes the authentication method more convenient and reliable.

In a situation that the communication apparatus is a communication terminal, when the user and the owner of the communication apparatus are different, the communication terminal is locked. In a situation that the communication apparatus is a communication card, when the user and the owner of the communication apparatus are the different, the communication card is locked. In a situation that the communication apparatus comprises a communication terminal and a communication card arranged in the communication terminal, when the user and the owner of the communication apparatus are the different, any one or both of the communication terminal and the communication card may be locked. It should be noted that in the situation that the communication apparatus is a communication card, restarting the communication apparatus means that the communication card is connected to the communication network once again to achieve a communication function.

As a specific application of the present invention, the communication apparatus may comprise at least one of a mobile phone and a SIM card. Taking a case that the communication apparatus comprises a mobile phone as an example, identity information of the owner of the communication apparatus is bound to the mobile phone, when the mobile phone is restarted, an instruction of requesting for identity information of the user may be issued, and the identity information of the user obtained through requesting is compared with the identity information of the owner of the communication apparatus. If the identity information of the user is different from the identity information of the owner of the communication apparatus, it is determined that the mobile phone is being controlled by a person other than its owner, and at this time, the mobile phone is locked, so as to prevent the information stored in the mobile phone from leaking out.

The specific forms of the identity information of the owner of the communication apparatus and the user are not limited, as long as the identities of the owner of the communication apparatus and the user can be judged therefrom. For example, the identity information of the owner of the communication apparatus and the user may be fingerprint information, facial information, voice information of the owner and the user, or the like. For easy of judgment, preferably, the identity information of the owner of the communication apparatus includes information in the identity card of the owner of the mobile phone, the identity information of the user includes information in the identity card of the user.

As described above, the communication apparatus may comprise at least one of a communication terminal and a communication card, as a specific implementation of the present invention, the communication apparatus comprises a communication terminal and a communication card which is replaceably arranged in the communication terminal, in order to improve the reliability of the authentication method, step S10 may specifically comprise:

S11: obtaining the information of the communication card which is currently arranged in the communication terminal (i.e., the original communication card) and the information in the identity card of the owner of the communication apparatus; and S12: storing the obtained information in the identity card of the owner of the communication apparatus and the information of the communication card.

When the communication card in the communication terminal is replaced by anew communication card, step S20 may further comprise a step of requesting to obtain information of the new communication card.

In general, when the owner of the communication apparatus loses the communication apparatus, another user may generally replace the communication card with a new communication card when she/he starts to use this communication apparatus. At this time, since the information of the new communication card obtained through requesting is different from that of the original communication card, and the identity information of the user is different from that of the owner of the communication apparatus, the communication apparatus can be locked.

In order to use the communication apparatus normally after the owner replaces the original communication card with a new communication card, further, as shown in FIG. 1, after the communication apparatus is started normally in step S50, the authentication method further comprises step S70 after step S50 is performed.

S70: deleting the information of the stored original communication card.

For example, when the communication card is replaced, the identity information of the user is compared with that of the owner of the communication apparatus in step S30, and whether the identity information of the user is the same as that of the owner of the communication apparatus or not is determined in step S40. When the identity information of the user is the same as that of the owner of the communication apparatus (i.e., the communication card is replaced by the owner of the communication apparatus), the stored information of the communication card (i.e., the original communication card) is deleted, in other words, binding between the original communication card and the identity information of the owner of the communication apparatus is removed. It may be easily understood that when the communication apparatus is under new ownership, in a situation that the identity information of the user is the same as that of the owner, the stored identity information of the owner of the communication apparatus may be removed, and identity information of the new owner is requested, so that the identity information of the new owner can be bound to the communication apparatus.

Further, as shown in FIG. 1, the authentication method further comprises step S80: obtaining information of the current communication card (that is, the new communication card), and storing the information of the new communication card, so as to bind the new communication card to the communication apparatus and the identity information of the owner.

In the authentication method provided by the present invention, when the identity information of a user is the same as that of the owner of a communication apparatus, the communication apparatus is started normally; when the identity information of the user is different from that of the owner of the communication apparatus, the communication apparatus is locked, which can prevent the communication apparatus from being operated by a user other than the owner of the communication apparatus, thus reducing the occurrence of information leakage from the communication apparatus. Meanwhile, the identity information used in the authentication method is the information in the identity cards of the owner of the communication apparatus and the user, and can be hardly lost, which makes the authentication method more convenient and reliable.

Figure 2:
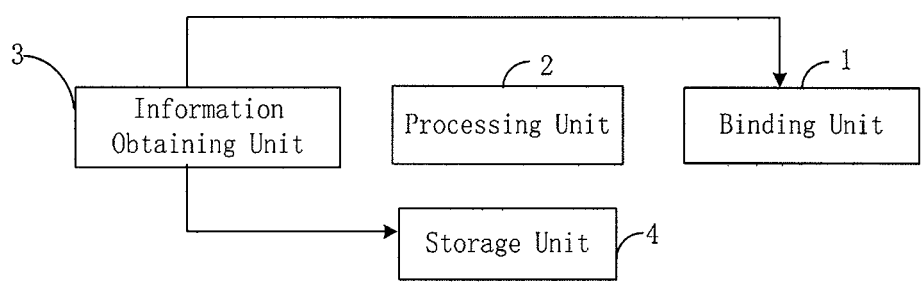
FIG. 2 is a schematic diagram of a structure of an authentication device for communication apparatus provided by the present invention.

As another aspect of the present invention, an authentication device for communication apparatus is provided, the communication apparatus comprises at least one of a communication terminal and a communication card, and as shown in FIG. 2, the authentication device may comprise: a binding unit 1, a processing unit 2 and an information obtaining unit 3, both the binding unit 1 and the information obtaining unit 3 are electrically connected to the processing unit 2, the binding unit 1 may bind identity information of owner of the communication apparatus to the communication apparatus, the information obtaining unit 3 may obtain identity information of a user and the identity information of owner of the communication apparatus, the processing unit 2 may issue a request instruction of requesting to obtain the identity information of the user, and may compare the identity information of the user obtained by the information obtaining unit 3 with the identity information of the owner of the communication apparatus, and the communication apparatus is started normally if the identity information of the user is the same as the identity information of the owner of the communication apparatus or the communication apparatus is locked if the identity information of the user is different from the identity information of the owner of the communication apparatus.

In order to simplify the structure of the authentication device, as a preferable implementation, the identity information of the owner of the communication apparatus may include information in identity card of the owner of the communication apparatus; the identity information of the user may include information in identity card of the user. The beneficial effects of using the information in the identity cards of the user and the owner are as follows: recognition process of an identity card is convenient and easy, and since the identity card can be hardly lost, and information stored therein is relatively stable, the occurrence of a situation in which the use by the owner is affected due to error of identity information may be reduced.

As a specific implementation, the communication apparatus comprises a communication terminal and a communication card which is replaceably arranged in the communication terminal, and the information obtaining unit may comprise a first obtaining module and a second obtaining module. The first obtain module may obtain the information of the communication card arranged in the communication terminal. The second obtaining module may obtain the information in the identity card of the owner and the user. Corresponding to the identity card of the owner, or the user, the second obtaining module may comprise an identity card scanning structure. As shown in FIG. 2, the authentication device further comprises a storage unit 4, to which both the information obtaining unit 3 and the processing unit 2 are electrically connected, and the storage unit 4 may store the information of the communication card obtained by the first obtaining unit and the information in the identity card of the owner of the communication apparatus obtained by the second obtaining unit. When the communication card arranged in the communication terminal is replaced by a new communication card, the processing unit 2 may issue a request instruction of requesting to obtain information of the new communication card. In order to facilitate the owner to replace the communication, further, the processing unit 2 may delete the information of the original communication card stored in the storage unit after the communication apparatus is started normally, so as to remove the binding between the original communication card and the identity information of the owner of the communication apparatus. Specifically, for ease of storage and erasion of the information, the storage unit 4 may comprise an electrically erasable programmable read-only memory (EEPROM).

Specifically, the communication terminal may be provided with an unbinding function. When the unbinding function is chosen, the processing unit 2 may issue a request instruction of requesting for identity information of the user. At this point, information in the identity card of the user may be obtained by the second obtaining unit. If the processing unit 2 determines that the identity information of the user is the same as that of the owner of the communication apparatus through comparison (i.e., the unbinding operation is performed by the owner of the communication apparatus), the information of the original communication card stored in the storage unit 4 is deleted, and at this time, the communication card can be easily replaced. If the processing unit 2 determines that the identity information of the user is different from that of the owner of the communication apparatus through comparison (i.e., the unbinding operation is not performed by the owner of the communication apparatus), the information of the communication card stored in the storage unit 4 maintains unchanged. It can be easily understood that, in this situation, replacing the communication card will cause the communication apparatus to restart, and since the identity information of the user is different from that of the owner of the communication apparatus, the communication apparatus is locked.

Further, the first obtaining module may obtain the information of the new communication card, and the storage unit 4 may store the information of the new communication card, thus the information of the new communication card can be bound to the communication apparatus and the identity information of the owner of the communication apparatus after the communication card is replaced by the owner of the communication apparatus.

Below, the authentication process is explained by taking a case that the communication apparatus comprises a mobile phone and a SIM card as an example.

When the owner of the communication apparatus installs the SIM card inside the mobile phone for the first time, the first obtaining module reads the information of the SIM card and stores the information in the storage unit 4, and the second obtaining module reads the information in the identity card of the owner of the communication apparatus and stores the information in the identity card in the storage unit 4 in association with the information of the SIM card, thus the binding unit 1 binds the SIM card to the mobile phone and the identity information of the owner of the communication apparatus. In a situation that the owner loses the mobile phone, once the user who illegally obtain this mobile phone restarts the mobile phone after turning off the mobile phone or replacing the SIM card, the processing unit 2 will issue an instruction of requesting to obtain identity information, and at this time, since the identity information of the user is different from that of the owner of the communication apparatus, the mobile phone is locked, thus the mobile phone is prevented from being used by a user other than its owner.

When the owner of the communication apparatus needs to replace the original SIM card with a new one, the unbinding function of the mobile phone is enabled at first. Then, the processing unit 2 issues an instruction of requesting to obtain identity information, so that the identity card of the user is scanned by the second obtaining module. Subsequently, the processing unit 2 deletes the information of the original SIM card stored in the storage unit 4 when it determines that the identity information of the user obtained by the second obtaining module and the identity information of the owner of the communication apparatus stored in the storage unit 4 are the same, and issues instructions of requesting to obtain identity information and requesting to obtain information of the new SIM card when the original SIM card is replaced by the new SIM card and the mobile phone is restarted. After the mobile phone is started normally, the first obtaining module obtains the information of the new SIM card, and the obtained information of the new SIM card is stored in the storage unit 4, so that the information of the new SIM card is bound to the identity information of the owner of the communication apparatus.

As still another aspect of the present invention, a communication apparatus is provided, and the communication apparatus comprises at least one of a communication terminal and a communication card, and the above authentication device provided by the present invention. The communication terminal may be a mobile phone, a Pad with a communication function, or the like.

It can be understood that the above implementations are only exemplary implementations for illustrating the principle of the present invention, but the present invention is not limited thereto. Various variations and improvements may be made by the person of ordinary skill in the art without departing from the spirit and essence of the present invention, and these variations and improvements should also be considered to be within the protection scope of the present invention.

The invention claimed is:

1. An authentication method for communication apparatus, the communication apparatus comprising at least one of a communication terminal and a communication card, and the authentication method comprising steps of:
   binding identity information of owner of the communication apparatus to the communication apparatus;
   requesting to obtain identity information of a user when the communication apparatus is restarted;
   comparing the identity information of the user obtained through requesting with the identity information of the owner of the communication apparatus bound to the communication apparatus; and
   determining whether the obtained identity information of the user is the same as the identity information of the owner of the communication apparatus bound to the communication apparatus, and if yes, then performing a step of starting the communication apparatus normally, otherwise, performing a step of locking the communication apparatus,
   wherein the identity information includes information in Identity (ID) card, fingerprint information, facial information, or voice information, and the information in ID card is able to be read by a scanning structure; and
   wherein the step of binding the identity information of the owner of the communication apparatus comprises reading the information in the ID card of the owner of the communication apparatus by the scanning structure and then binding the information in the ID card of the owner of the communication apparatus read by the scanning structure.

2. The authentication method for communication apparatus of claim 1, wherein, the identity information of the owner of the communication apparatus includes information in ID card of the owner of the communication apparatus; the identity information of the user includes information in ID card of the user.

3. The authentication method for communication apparatus of claim 2, wherein, the communication apparatus comprises the communication terminal and the communication card which is replaceably arranged in the communication terminal, and the step of binding identity information of owner of the communication apparatus to the communication apparatus specifically comprises:
   obtaining information of the communication card and the information in the ID card of the owner of the communication apparatus; and
   storing the information in the ID card of the owner of the communication apparatus and the information of the communication card.

4. The authentication method for communication apparatus of claim 3, wherein, when the communication card in the communication terminal is replaced by a new communication card, the step of requesting to obtain identity information of a user when the communication apparatus is restarted further comprises a step of:
   requesting to obtain information of the new communication card.

5. The authentication method for communication apparatus of claim 4, wherein, after the step of starting the communication apparatus normally is performed, the authentication method further comprises a step of:
   deleting the stored information of the communication card.

6. The authentication method for communication apparatus of claim 5, further comprising a step of: obtaining information of the new communication card, and storing the information of the new communication card.

7. An authentication device for communication apparatus, the communication apparatus comprising at least one of a communication terminal and a communication card, and the authentication device comprising: a binding unit, a processing unit and an information obtaining unit, wherein, both the binding unit and the information obtaining unit are electrically connected to the processing unit, the binding unit is capable of binding identity information of owner of the communication apparatus to the communication apparatus, the information obtaining unit is capable of obtaining identity information of a user and the identity information of the owner of the communication apparatus, the processing unit is capable of issuing a request instruction of requesting to obtain the identity information of the user and comparing the identity information of the user obtained by the information obtaining unit with the identity information of the owner of the communication apparatus, and the communication apparatus is started normally if the identity information of the user is the same as the identity information of the owner of the communication apparatus or the communication apparatus is locked if the identity information of the user is different from the identity information of the owner of the communication apparatus,
   wherein the identity information includes information in Identity (ID) card, fingerprint information, facial information, or voice information, and the information in ID card is able to be read by a scanning structure; and
   wherein the binding unit binds the identity information of the owner of the communication apparatus after acquiring the information in the ID card of the owner of the communication apparatus read by the scanning structure.

8. The authentication device for communication apparatus of claim 7, wherein, the identity information of the owner of the communication apparatus includes information in ID card of the owner of the communication apparatus; the identity information of the user includes information in ID card of the user.

9. The authentication device for communication apparatus of claim 8, wherein, the communication apparatus comprises the communication terminal and the communication card which is replaceably arranged in the communication terminal, the information obtaining unit comprises a first obtaining module capable of obtaining the information of the communication card arranged in the communication terminal and a second obtaining module capable of obtaining the information in the ID card of the user and the information in the ID card of the owner of the communication apparatus, the authentication device further comprises a storage unit, which is capable of storing the obtained information of the communication card and the information in the ID card of the owner of the communication apparatus, and when the communication card arranged in the communication terminal is replaced by a new communication card, the processing unit is capable of issuing a request instruction requesting to obtaining information of the new communication card.

10. The authentication device for communication apparatus of claim 9, wherein, the processing unit is capable of deleting the information of the communication card stored in the storage unit after the communication apparatus is started normally.

11. The authentication device for communication apparatus of claim 10, wherein, when the communication card arranged in the communication terminal is replaced by a new communication card, the first obtaining module is capable of obtaining the information of the new communication card, and the storage unit is capable of storing the information of the new communication card.

12. A communication apparatus, comprising at least one of a communication terminal, a communication card and the authentication device of claim 7.

* * * * *